March 8, 1938.  J. W. CHANNELL  2,110,287
SPLICING MACHINE
Filed Sept. 2, 1936   6 Sheets-Sheet 1

INVENTOR
J. W. CHANNELL
BY J. MacDonald
ATTORNEY

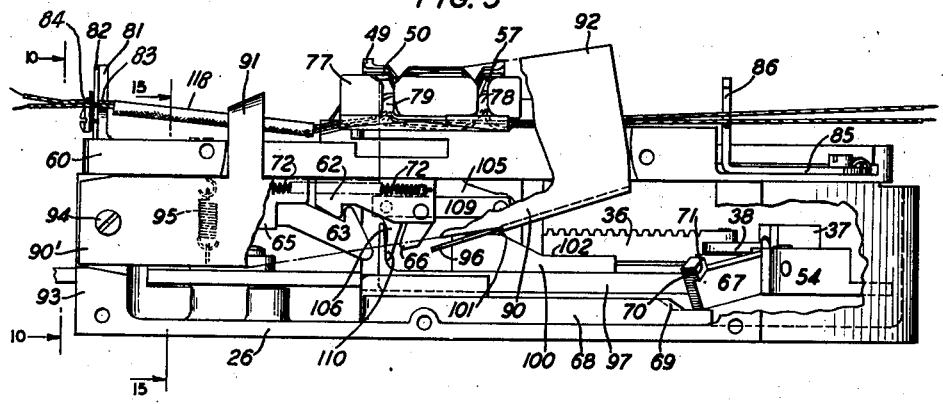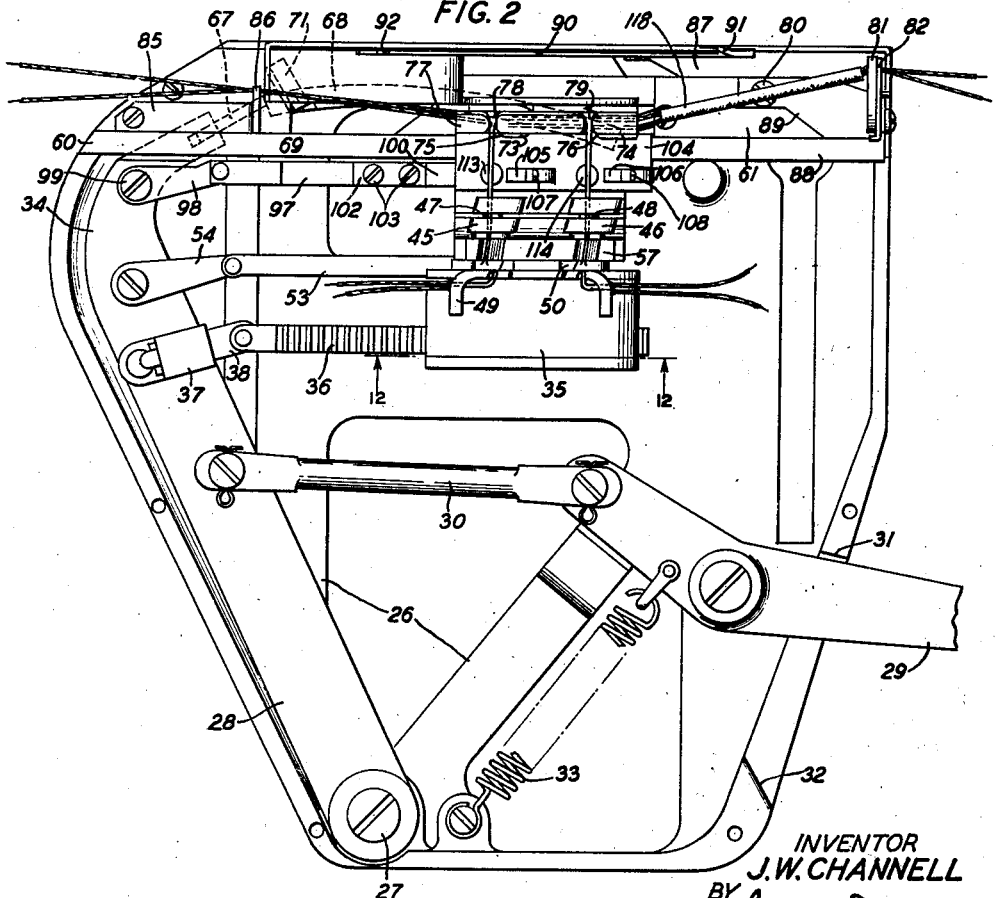

March 8, 1938.  J. W. CHANNELL  2,110,287
SPLICING MACHINE
Filed Sept. 2, 1936   6 Sheets-Sheet 3

INVENTOR
J. W. CHANNELL
BY J. MacDonald
ATTORNEY

March 8, 1938.  J. W. CHANNELL  2,110,287
SPLICING MACHINE
Filed Sept. 2, 1936  6 Sheets-Sheet 4
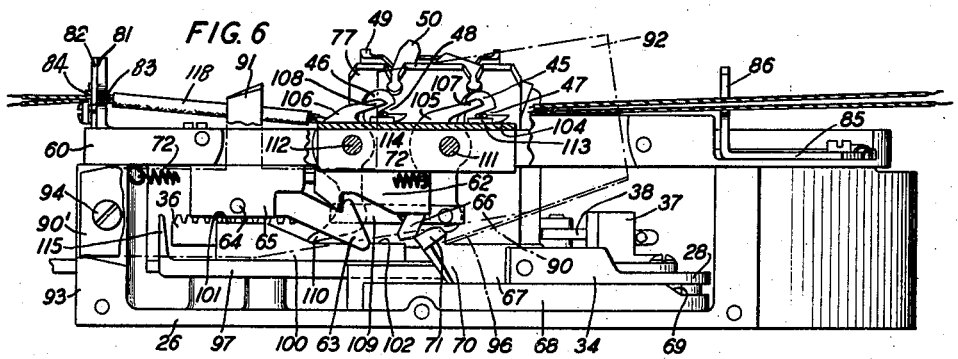
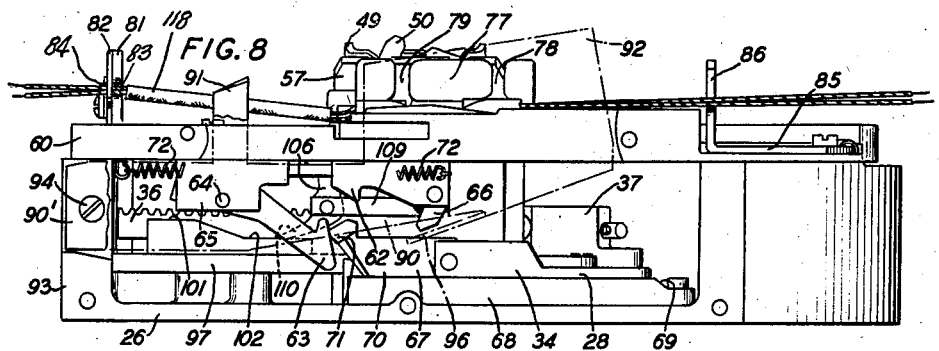
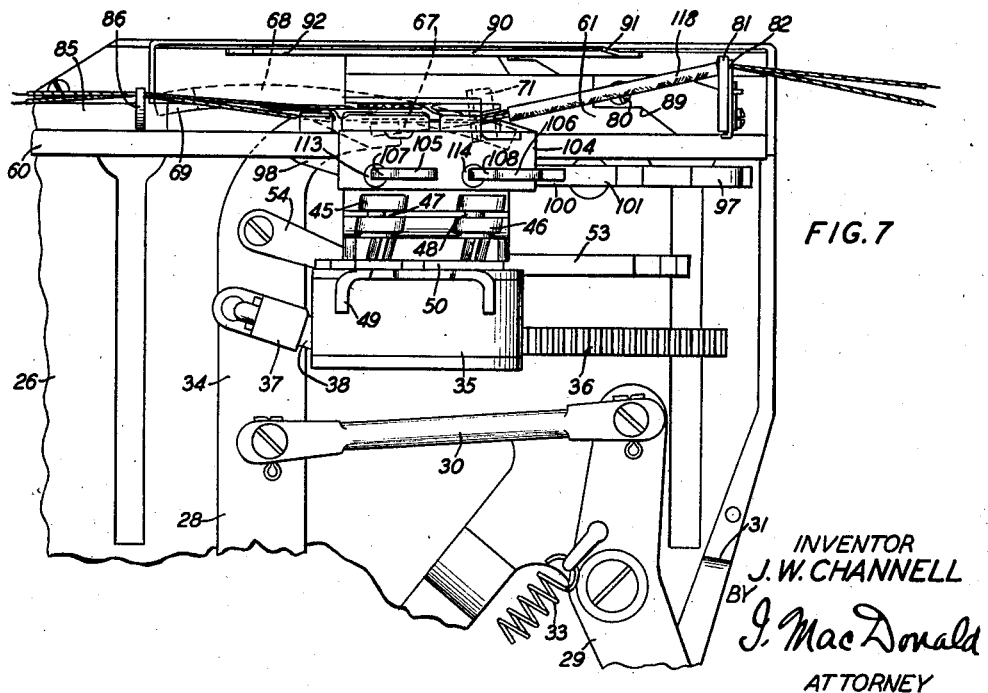
INVENTOR
J. W. CHANNELL
BY
J. MacDonald
ATTORNEY March 8, 1938.  J. W. CHANNELL  2,110,287
SPLICING MACHINE
Filed Sept. 2, 1936  6 Sheets-Sheet 5
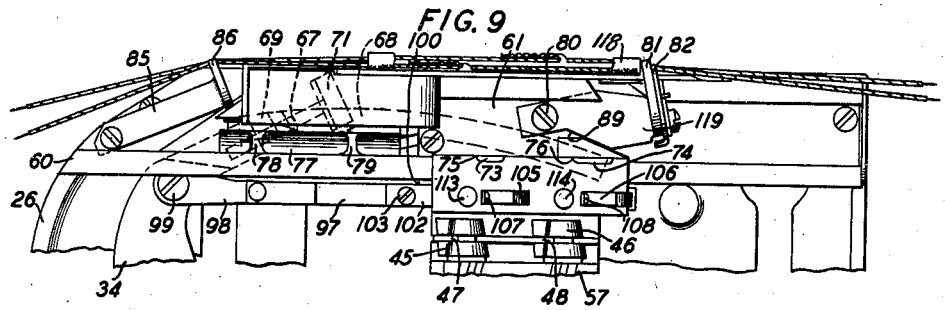
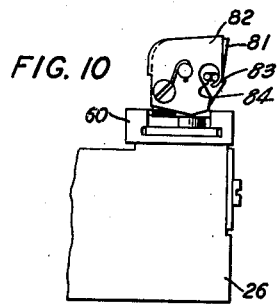 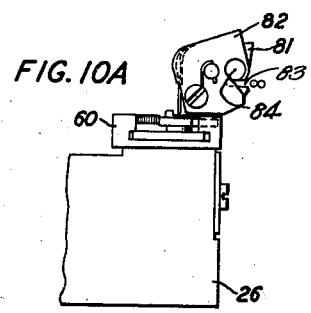
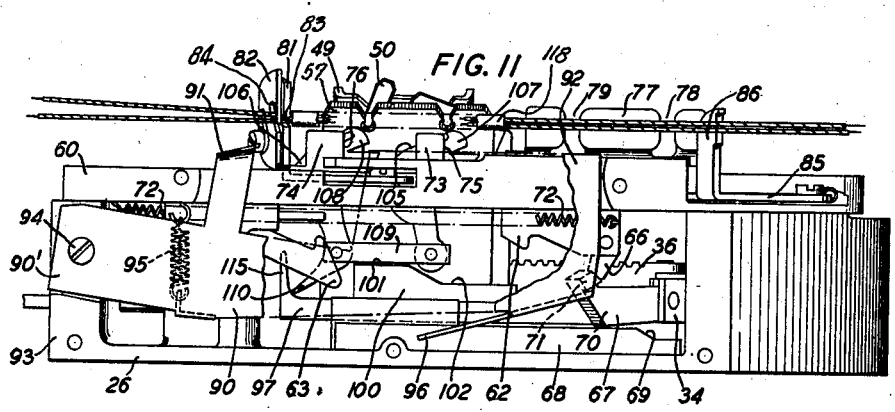
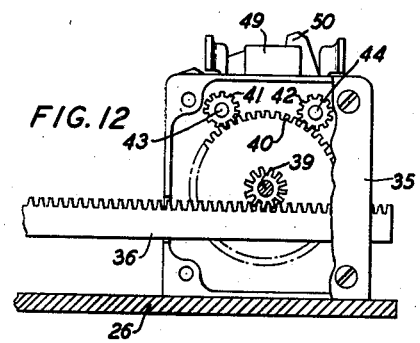
INVENTOR
J. W. CHANNELL
BY J. MacDonald
ATTORNEY March 8, 1938.  J. W. CHANNELL  2,110,287
SPLICING MACHINE
Filed Sept. 2, 1936   6 Sheets-Sheet 6
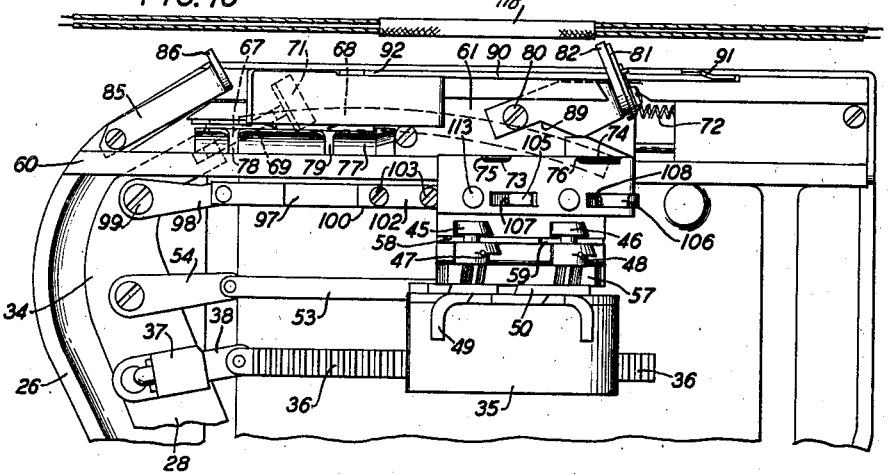
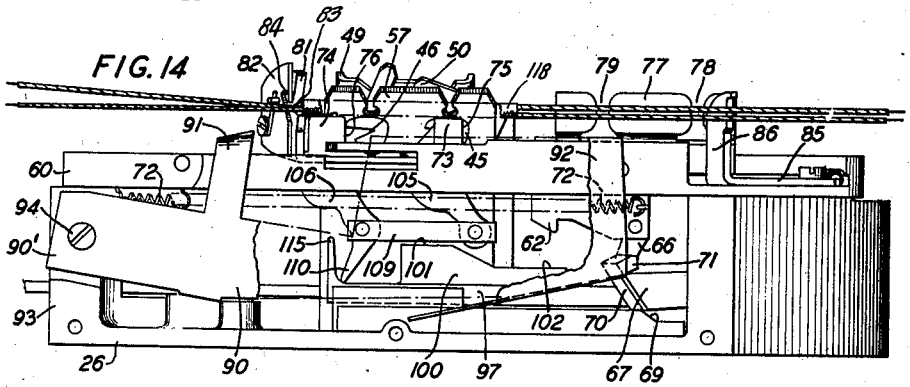
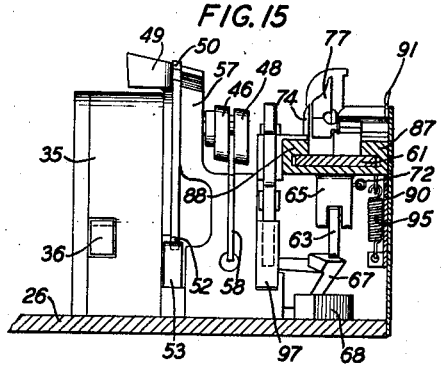
INVENTOR
J. W. CHANNELL
BY
J. MacDonald
ATTORNEY Patented Mar. 8, 1938

2,110,287

UNITED STATES PATENT OFFICE 2,110,287

SPLICING MACHINE

James W. Channell, West Los Angeles, Calif.

Application September 2, 1936, Serial No. 99,044

8 Claims. (Cl. 140—119)

This invention relates to wire twisting apparatus, and particularly to means for splicing electrical conductors, such, for example, as the wires of telephone cable, and is an improvement in the splicing machine which forms the subject of my Patent No. 1,813,562 issued July 7, 1931.

A feature of this invention is the provision of a machine of this character which will simultaneously make a pair of joints which are staggered on straight or multiple splices and which will position a single insulating sleeve over these joints by only one actuation of the operating handle of the machine. Such an arrangement not only effects a saving in sleeves, but materially reduces the overall size of the joint in the cable itself, which is of great importance, especially where the cable is located in conduits.

Another feature is the provision of twisting means which will accommodate various sizes of wire.

A further feature is the provision of means for controlling the pitch of the twisted joints.

More specifically, in the machine of this invention the ends of the wires to be joined normally extend in opposite directions and are loosely held in position by a projection on each end of the splicing machine. Over the ends of the pair of wires to the right of the machine is positioned a cotton sleeve which will later be slipped over the joints. Each of these wires is then brought through a V-shaped groove and against a sharp abutment which strips the paper from the wires as they are pulled thereagainst. The wires are then positioned, one above each of the twisting heads and the free ends brought out between a pair of notched blades which later serve to cut off the surplus wire. The other pair of wires or the ones to the left of the machine are now positioned one in each of the V-shaped grooves and the paper stripped therefrom and positioned above the twisting heads with their respective free ends extending through the cutting notches as above explained.

The first action which occurs in the performance of the twisting operation is the operation of a lever which actuates a pair of cutting blades which cuts off the surplus wire. This is accomplished by means of a pair of notched plates in which the ends of the wire have been previously positioned. Upon continued movement of the operating lever the twisting heads engage their respective pairs of wires, one wire extending from each side of the machine, and twist them one about the other. As the movement of the operating lever continues, the pairs of wires are further twisted. After a predetermined number of twists have been put in the pairs of wires a latch or finger engages the twisted portion of the wires midway between the twisting heads and the stripping mechanism, thus preventing the wires beyond the latch or finger from being twisted any further. However, the twisting heads continue to rotate thereby twisting off the wires at the point where they are held in the twisting heads. The spliced wires then leave the twisting mechanism, and the insulating sleeve which has been previously placed on the wire and in the sleeve slipping mechanism, is slipped over the pair of joints and the wires are then ejected from the machine as the lever returns to its normal position.

In the drawings:

Fig. 2 is a top plan view with the cover removed, the operating parts in their normal position and the wires to be joined in their respective positions;

Fig. 3 is an end view of Fig. 2 partly in section and with parts broken away to show the operating mechanism;

Fig. 5a is a fragmentary view partly in section of Fig. 4 taken on line 5a—5a;

Fig. 6 is an end view similar to Fig. 5, but showing the position of the various parts just prior to the completion of the splice;

Fig. 7 is a fragmentary top plan view of the machine at the completion of the splice just prior to its ejection;

Fig. 8 is an end view of Fig. 7;

Fig. 9 is a fragmentary top plan view showing the sleeve slipped over the joints and ready to be ejected;

Fig. 10 is a fragmentary end view of the slipping and ejecting mechanism taken on the lines 10—10 of Fig. 3;

Fig. 10a is a view similar to Fig. 10 in its operated or ejected position;

Fig. 11 is an end view partly in section of Fig. 9;

Fig. 12 is a fragmentary view partly in section taken on line 12—12 of Fig. 2;

Fig. 13 is a fragmentary top plan view with the sleeve covered joint ejected from the machine;

Fig. 14 is an end view of Fig. 13;

Fig. 15 is a fragmentary sectional view taken on line 15—15 of Fig. 3;

In the splicing of pairs of wires in telephone and telegraph cables by means of the so-called "pigtail" splice it is desirable to have a non-uniform pitch, the lack of uniformity in the pitch tending to prevent an unscrewing action when tension is applied to the twisted joint. When the free ends of the two parallel wires are gripped and twisted one about the other, the greatest twisting stress takes place at the point where the torque is applied. Therefore, should the twisting continue beyond a certain point the wire will be twisted off. In the machine of this invention, shown in Fig. 1, as in my previous patent heretofore referred to, I have utilized this principle which results in the types of splice shown in Figs. 16 and 17.

Figure 16:
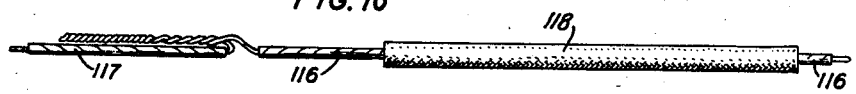
Fig. 16 is an enlarged view of a completed joint with a single pair of wires and the sleeve in a position it would assume just prior to it being slipped over the joint.
Figure 17:
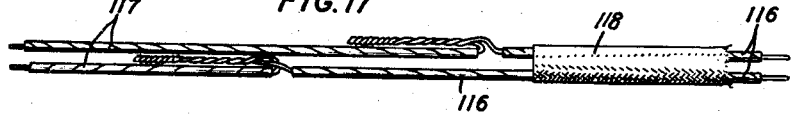
Fig. 17 is an enlarged view of the completed joint illustrating the position the two pairs of wires assume just prior to the slipping of the sleeve, a portion of the sleeve only being shown.

By referring to Figs. 16 and 17 it is readily apparent that the twisted portion of the wire is not uniform and that the ends of the pigtail are twisted very much tighter than the upper portion of the joint.

Figure 18:
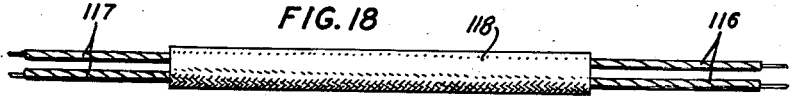
Fig. 18 is an enlarged view showing the insulating sleeve slipped over the joints in the pairs of wires.
Figure 4:
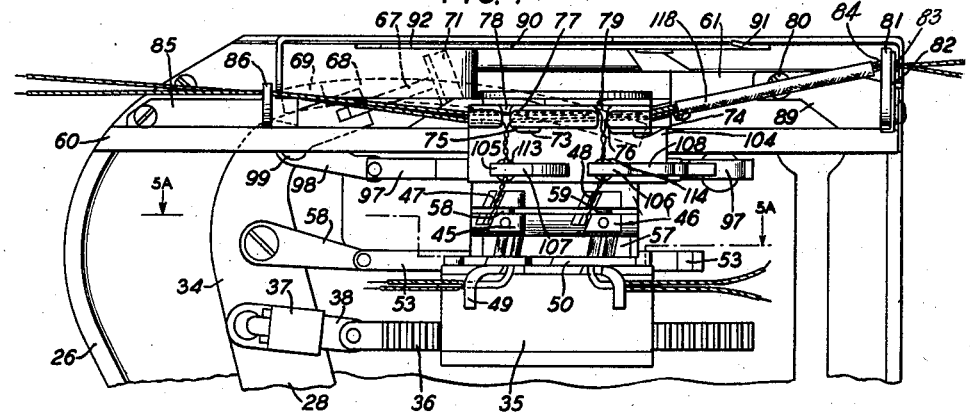
Fig. 4 is a fragmentary top plan view similar to Fig. 2 except that the wires are now in the twisting head and the surplus wire cut off.

The splicing machine of this invention is adapted for splicing two pairs of wires simultaneously, staggering the joints, and slipping a single sleeve over the two joints as shown in Figs. 17 and 18.

Figure 1:
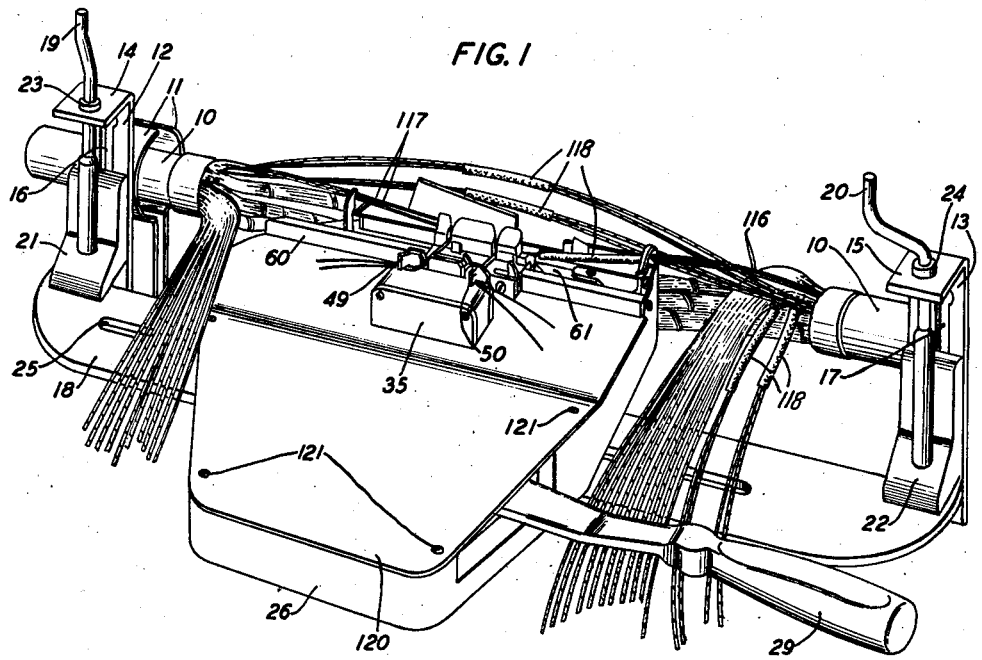
Fig. 1 is a perspective view of the wire splicing machine in the position which it would occupy during the splicing of a lead covered cable.

Fig. 1 illustrates the splicing machine set up in position to splice together the conductors of a lead-covered telephone cable, the opposite ends of which are indicated at 10. The cable ends 10 are brought opposite each other and spaced sufficiently far enough apart to allow freedom for the splicing operation and for the space that has to be occupied by the completed splice.

Referring to Fig. 1, a pair of clamps 11 are provided having arms adapted to be tightened around the cable ends 10 by means of suitable bolts. The front members of each of these clamps have long shank portions 12 and 13 which are bent at the top to provide the supporting flanges 14 and 15. These shank portions are provided with longitudinal slots 16 and 17 to permit the movement of the support for the cable splicing machine.

The support for the cable splicing machine comprises a metallic plate 18 provided at its end portions with means which engage the slots 16 and 17 to prevent the vertical movement thereof. The crank bolts 19 and 20 pass downwardly through an aperture in the flanges 14 and 15 and threadedly engage the upstanding bosses 21 and 22 on the plate 18. The bolts 19 and 20 are provided with flanges 23 and 24 which engage the flanges 14 and 15 and support the weight of the machine, and provide means for raising and lowering it. Means for permitting longitudinal movement of the machine is provided by the slot 25 in the plate 18 which has suitable bolts mounted therein (not shown).

The splicing machine is provided with a base 26 which has provided therein a pair of slots which are at right angles to the slot 25, the base being secured to the plate 18 by means of bolts which pass through both sets of slots and which may be tightened to secure the machine in any desired position.

As shown in Figs. 1, 2 and 7 there is pivotally mounted at 27 a lever arm 28 which is actuated by means of the handle 29 through the linkage 30. The handle 29 travels from the stop 31 to the stop 32, spring 33 restoring the handle 29 to its normal position as shown in Figs. 1 and 2. The upper end 34 of the lever arm 28 is adapted to operate the various elements of the mechanism in a manner that will hereinafter be described.

Mounted upon the base 26 is a gear box 35 which houses a train of gears of large ultimate ratio (see Fig. 12) which is driven by a horizontal rack 36 which extends through the gear box and is connected to the lever arm 34 by a double pivoted and yieldable linkage which comprises a pivoted body portion 37 and a pivoted plunger 38.

As shown in Fig. 12 the rack 36 drives a pinion 39 which, being integral with the large gear 40, causes it to rotate, thereby driving the pinions 41 and 42 which are in turn secured to a pair of spaced apart horizontal spindles 43 and 44 on the opposite ends of which are mounted the twisting heads 45 and 46. These twisting heads comprise conical shaped bodies having tangential arms extending therefrom and at the junction of the arms and the body are relatively deep slots 47 and 48. The dimensions of the twisting heads are such that the arms in rotating seize upon the pair of wires to be twisted and force them into the slots to be retained therein during the twisting operation and the formation of the splice.

Figure 5A:
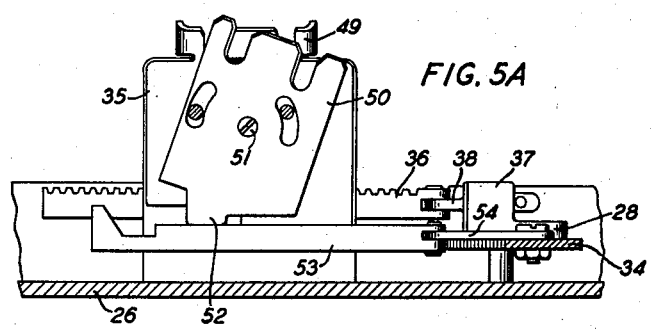

Mounted on the rear face of the gear box 35 is a fixed cutter blade 49 and a movable cutter blade 50, this movable blade 50 being pivoted at 51 as shown in Fig. 5a and has a downwardly extending portion 52 which engages and is actuated by the sliding bar 53 which in turn is pivotally connected to the upper end 34 of the lever arm 28 by means of the linkage 54. (See Figs. 2, 4, 7, 13, and 15.) The cutting blades 49 and 50 have cooperating pairs of cutting edges 55 and 56 and they form a double shearing device operated by the projection 52 engaging a notch in the sliding bar 53. The angular movement of the cutter blade 50 is limited by the fact that the projection 52 leaves the notch in the bar 53 and rides upon the surface thereof after the cutter has severed the wire (see Fig. 5a).

Located in the rear of the shearing device just described and adjacent to the twisting heads 45 and 46 is a stationary plate 57 the function of which is described in detail below. As shown in the various figures the twisting heads 45 and 46 are provided with circumferential grooves and the arms on the twisters are spaced apart a distance equal to the groove. This construction permits the use of a very simple ejecting device for dislodging the wire ends after they have been twisted off and which might stay in the longitudinal slots in the twisting heads. The ejecting device for each twisting head comprises the yieldable fingers 58 and 59 which are positioned in the grooves of the twisting heads and held in engagement therewith by suitable springs (not shown) which permit the wire to pass thereby during the twisting operation, but on a reversal of the twisting heads the fingers do not yield, thereby removing from the grooves any wire remaining therein.

At the rear of the base 26 and mounted above it is a slideway 60, the bottom of which is open as shown in the various figures. Slidably located in the slideway 60 is a carriage 61 which has several parts extending downwardly through the opening in the slideway.

One of the downwardly projecting portions comprises a projection 62 by means of which the carriage 61 is held in normal position, as shown in Figs. 1 and 2, at the right-hand side of the machine until released by the trigger 63 which is pivoted at 64 to the portion 65 of the slideway 60 and is held in position by means of a spring (not shown). Mounted on the projection 62 is a pawl 66 by which the carriage 61 is moved to the left when a projection on the lever arm is engaged therewith, the operation of which is as follows:

The upper end 34 of the lever arm 28 carries a pivoted hook bar 67, the free end of which rides on the arcuate track 68 which extends upwardly from the base and which comprises two levels joined by the inclined portion 69. The free end 70 of the bar 67 when raised up upon the right-hand portion of the track 68 is adapted to engage and release the trigger 63. The hook 71 will then have passed by and be in a position to engage the pawl 66 so that when the lever arm 28 is restored to its normal position the hook 71 will engage the pawl 66 and carry the carriage 61 to the left within the slideway 60, as shown in Figs. 13 and 14, until the hook portion which is riding on the upper level of the track 68 drops down to the lower level over the inclined portion 69. This causes the hook 71 to be disengaged from the pawl 66 thereby permitting the carriage 61 to be restored to its normal position at the right of the machine by means of the spring 72. The projection 62 will then engage the trigger 63 thereby completing the cycle of operation.

Located at the central portion of the slideway 60 are the upstanding lugs 73 and 74 which are provided with blunt edges 75 and 76. A plate 77, having a pair of notches 78 and 79, is mounted on the carriage 61, one edge of each notch being in alignment with the edges 75 and 76 of the lugs 73 and 74. These edges provide a means for breaking the paper insulation on the wires 116 and 117 when the wires are bent therearound thereby permitting the insulation to be readily stripped from the wires to be joined.

At the right-hand end of the carriage 61 is mounted a combined sleeve holding and ejecting device. The mechanism is pivoted to the carriage at 80 and has an upstanding lug 81 and a trigger 82 is pivotally mounted on the outside face of said lug and has a horizontal notch 83 therein which is in alignment with the notch 84 in the lug 81. Located on the left end of the slideway 60 is an arm 85 having a notched lug 86 mounted thereon. The ejecting mechanism is confined between the two rails 87 and 88 of the slideway and bears against the inner side of rail 88. The cut-out portion 89 on the ejection mechanism is adapted to engage a projection on the rail 88, which causes the ejecting device to pivot about the bearing 80, allowing the trigger 82 to release, thereby permitting the ejecting device to push the wire away from the machine, as shown in Fig. 9. At the time this action occurs the arm 85 is also caused to move outwardly by the action of a projection on the carriage as shown in Fig. 9.

The ejecting elements are restored to their normal position, as shown in Fig. 1, when the lever arm 28 is returned against its stop 31.

The mechanism for keeping the ejected wire away from the twisting mechanism comprises the plate 90, shown in dot and dash and full lines in the various figures, which has provided thereon the upstanding portions 91 and 92 which when in normal position project upwardly about the slideway 60, as shown in Figs. 1, 3, 5, 6 and 8. This plate is pivotally mounted at its end 90, on the rear face of the side wall 93 at 94 and is normally held in its raised position, as shown in Figs. 1, 3, 5, 6 and 8 by means of the spring 95, one end of which is secured to the under side of the slideway 60 and the other end secured to the plate 90.

Secured to the lower inside edge of the plate 90 is a flat spring member 96 which projects a slight distance below the lower edge of the plate. When the handle 29 is operated and the lever arm 28 moves the pivoted hook bar 67 to the right on the track 68 the hook 71 on the free end 70 slides under the spring member 96, as shown on Figs. 6 and 7. When the lever arm 28 returns to its normal position and the bar 67 moves to the left the hook 71 engages the spring member 96 and causes the plate 90 to be depressed. See Figs. 11 and 12. This action is just prior to the time that the wires are ejected from the machine by the ejecting device heretofore described. After the carriage 61 has moved the full distance to the left the hook 71 slides off the spring 96 thereby permitting the plate 90 to be restored to its normal position due to the action of the spring 95 thereby holding the spliced wires away from the twisting mechanism.

Figure 5:
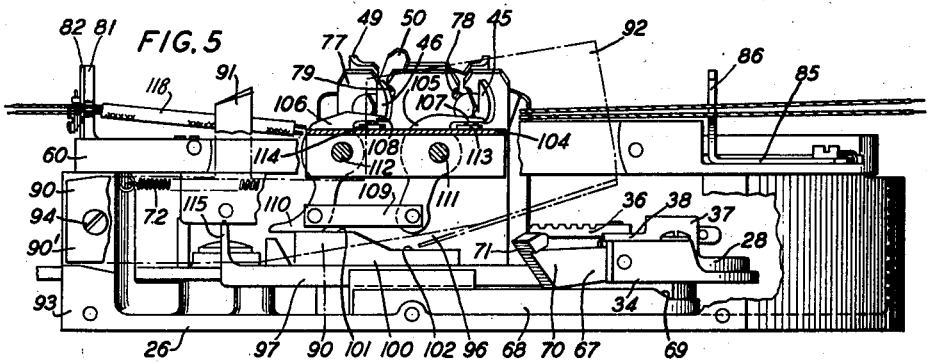
Fig. 5 is an end view partly in section of Fig. 4.

Mounted on the end 34 of the lever arm 28 is a horizontal bar 97. This bar is pivotally secured by means of a link member 98 to the end 34 by means of the stud 99, and is slidably mounted in suitable guides on the interior of the base 26 and is adapted to be moved to the right or to the left, simultaneously with the operation of the other arms and devices associated with the lever arm 28. Mounted on the bar 97 is a boss 100. This boss is provided with high and low portions 101 and 102 and is longitudinally adjustable with respect to the bar 97, said boss being secured in the desired position by means of the screws 103. Pivotally mounted on the extending portion 104 of the slideway 60 directly in back of the twisting heads 45 and 46 and in alignment therewith are a pair of fingers 105 and 106, provided with projecting portions 107 and 108. The lower ends of these fingers project through suitable openings in the member 104 and are joined at their lower ends by means of the link bar 109. The lower end of the finger 106 extends some distance below the bar 109 and is provided with a shoe 110 which is adapted to engage the boss 100 when the bar 109 is operated by means of the lever arm 28. When the shoe 110 contacts the high spot 101 of the boss 100 it causes the link bar 109 to move to the left as shown in Fig. 5, which causes the fingers 105 and 106 to pivot about their axis 111 and 112 thereby bringing the projecting portions 107 and 108 down into contact with the anvils 113 and 114 as shown in Fig. 5. The fingers remain in this position during the time the shoe 110 is riding on the high spot 101 on the boss 100. As the boss 100 and the bar 97 move further to the left the shoe 110 drops down to the low spot 102 on the boss 100 as shown in Figs. 6, 7 and 8. When this occurs the projections 107 and 108 of the fingers 105 and 106 leave the surface of the anvils 113 and 114 and assume the position as shown in Fig. 6. When the lever 97 returns to its normal position the shoe 110 rides back on the surface of the boss 100 and drops down into its normal position against the stop 115 as shown in Figs. 3, 11 and 14 thereby completing the cycle of operation. The purpose of the fingers 105 and 106 is to vary the twist in the pigtail by applying pressure at a definite place on the twisted portion of the wire and maintaining such pressure a sufficient length of time to provide the type of pigtail as shown in Figs. 16 and 17.

In splicing the ends of the cable 10—10, the cable ends are oppositely spaced with sufficient room between them for the splice. (See Fig. 1). The support for the machine, which is the plate 18, is secured to the cable ends by means of the clamps 11 and the machine is secured in position on the plate by means of bolts (not shown) which pass through aligned slots in the base 26 of the plate 18.

Assuming that two pairs of conductors such as 116 and 117 are to be spliced simultaneously, the right-hand pair 116 are untwisted and an insulating sleeve 118 is slid thereover as shown in Figs. 1, 2, 3, 4, 5, 6, 7 and 8. The thus separated conductors are now placed in the notches 78 and 79 of the plate 77 and bent around the blunt edges 75 and 76 of the lugs 73 and 74, which fractures the paper insulation and permits its ready removal and leaves the wires bare in a condition for splicing. The bared portion of the conductors is then drawn toward the front of the machine and positioned in the notches in the cutting blades 49 and 50 and are then bent around these notches at right angles and under the lugs on the cutting blade 49 to maintain them in position. The corresponding pair of conductors 117 located on the left-hand side of the machine are treated in a similar manner, as shown in Figs. 1 and 2. We now have two pairs of wires positioned in the machine ready for splicing, which will be insulated by means of a single sleeve. This is accomplished by the operation of the handle 29 which in turn operates the lever arm 28 which causes the functioning of the devices hereinafter described.

When the handle 29 is pulled toward the operator the lever arm 28 moves to the right due to the linkage 30. The lever arm 28 moving to the right causes the rack bar 36 also to move to the right, and being in mesh with the pinion 39 drives the large gear 40 which in turn drives the twisting gears 41 and 42 causing the twister heads 45 and 46 to rotate clockwise as viewed from the front of the machine. When this action takes place the projecting arms on the twisting heads engage the wires and cause them to be forced in the bottom of the slots 47 and 48 on the twisting heads 45 and 46, in order to hold them firmly during the twisting operation. At the time the twisting heads start their rotation the movable blade 50 rotates about its axis 51 by means of the sliding bar 53 which is secured to the lever arm 28 by means of the link 54. This bar 53 has a projection thereon which engages the blade and causes the shearing off of the wires which have been previously placed in slots of the cutting blades 49 and 50. The twister heads 45 and 46 continue to revolve and tightly twist the wires and after a predetermined number of twists have been given to the wires the fingers 105 and 106 are moved downwardly so as to exert pressure on the wires by firmly holding them against the anvils 113 and 114.

The fingers 105 and 106 are operated by means of a cam-shaped projection on the base 100 which has high and low spots 101 and 102 thereon to provide the proper time interval. This boss is mounted on the bar 97 which in turn is operated by means of the lever arm 28.

During this operation the twister heads 45 and 46 continue to rotate until the wires are twisted off to form the pigtail splice as shown in Figs. 16 and 17, the short piece of wire remaining in the twister slots being ejected therefrom by means of the ejecting fingers 58 and 59 when the operating handle 29 is released and the rotation of the twisting heads is reversed.

When the operating handle 29 has been pulled forward to its stop 32 the hook 71 will have released the trigger 63 and engaged the pawl 66, and on the return movement of the operating handle 29 the carriage 61 will be pulled to the left thereby causing the pigtails to be bent to the left in a manner as shown in Figs. 16 and 17. After the pigtails are bent to the left the insulating sleeve 118 is pushed to the left and over the spliced wires as shown in Fig. 9 and are finally ejected from the machine by ejecting mechanism 119 as shown in Figs. 9, 11, 13 and 14.

The other pairs of conductors in the cable are spliced in a similar manner. The machine may be shifted during the splicing operations so that the joints will be evenly distributed throughout the cable joint.

A cover plate 120 is secured to the base 26 by means of suitable screws 121.

What is claimed is:

1. A splicing machine comprising a pair of rapidly rotatable members adapted to engage and twist together simultaneously two or more pairs of approximately parallel wires and adjustable wire gripping means on said machine for putting a predetermined pitch in the twist of each joint.

2. A splicing machine comprising a pair of rapidly rotatable members adapted to engage and twist together simultaneously two or more pairs of approximately parallel wires, adjustable wire gripping means on said machine for putting a predetermined pitch in the twist of each joint, and means for ejecting the wires from the machine at the finish of the splicing operation.

3. A splicing machine comprising a pair of rapidly rotatable members adapted to engage and twist together, simultaneously, two or more pairs of approximately parallel wires, adjustable wire gripping means on said machine for putting a predetermined pitch in the twist of each joint, means for bending the splices parallel to said wires, and means for sliding a previously placed insulating sleeve over the bent splices of the pairs of wires.

4. A splicing machine comprising a base member, a pair of rotatable twister heads mounted on said base, each twister head adapted to receive and hold the wires, means for rotating said twister heads to simultaneously twist the pairs of wires, means for severing the surplus portion of the wires, and adjustable wire gripping means operable prior to the completion of the twist for putting a predetermined pitch in the twisted portion of the pairs.

5. A splicing machine having a pair of rotatable twister heads mounted thereon, means for rotating simultaneously said twister heads, said twister heads provided with slots therein which receive and hold the wires to be twisted, and means for insulating said joints comprising a single tubular sleeve, said single sleeve adapted to be positioned over the two joints in the wires on the completion of the splice.

6. A splicing machine having a pair of rotatable twister heads mounted thereon, means for rotating simultaneously said twister heads, said twister heads provided with slots therein which receive and hold the wires to be twisted, and means for insulating said joints comprising a single tubular sleeve, said single sleeve adapted to be positioned over the two joints in the wire on the completion of the splice, and means for ejecting the twisted joints and the enclosing sleeve from the machine.

7. Means for splicing two pairs of wires together simultaneously, staggering the splices and covering said splices with a single insulating sleeve comprising, a plurality of twisting devices, adjustable wire gripping means for rotating said twisting devices, means operated prior to the completion of the splice for varying the tightness of the splice, means for severing the surplus wire from the joint, and means for slipping an insulating sleeve over the two joints prior to the ejection of the splice from the machine.

8. A machine for splicing together simultaneously two pairs or more of conductors by twisting about each other the conductors of each comprising a pair of rotatable twisting heads which engage and twist simultaneously the pairs of wires, means for severing the surplus portion of the wires, adjustable wire gripping means for putting a predetermined pitch in the twisted portion of the joint, means for bending the twisted portions against the wire, means for slipping a previously placed insulating sleeve over the two joints, means for ejecting said completed joint from the machine, and means for preventing the ejected joint from coming in contact with the twisting mechanism once it is ejected from the machine.

JAMES W. CHANNELL.